(12) United States Patent
Weisser et al.

(10) Patent No.: US 7,044,611 B2
(45) Date of Patent: May 16, 2006

(54) OPTICAL DEVICE FOR USE UNDER SIGNIFICANTLY VARYING AMBIENT PRESSURE

(75) Inventors: Dirk Weisser, Linkenheim (DE); Traugott Tietz, Aalen (DE)

(73) Assignee: Carl Zeiss Optronics GmbH, Oberkochen (DE)

( * ) Notice: Subject to any disclaimer, the term of this patent is extended or adjusted under 35 U.S.C. 154(b) by 0 days.

(21) Appl. No.: 11/034,090

(22) Filed: Jan. 12, 2005

(65) Prior Publication Data

US 2005/0219697 A1 Oct. 6, 2005

(30) Foreign Application Priority Data

Jan. 13, 2004 (DE) .................. 10 2004 001 948

(51) Int. Cl.
*G02B 5/12* (2006.01)
(52) U.S. Cl. .................................. 359/513
(58) Field of Classification Search ............ 359/513, 359/514

See application file for complete search history.

(56) References Cited

U.S. PATENT DOCUMENTS

| 867,982 A | | 10/1907 | Lake | |
|---|---|---|---|---|
| 2,568,392 A | * | 9/1951 | Gilbert, Sr. | .................. 277/353 |
| 5,315,915 A | * | 5/1994 | Sprafke | ...................... 359/402 |

FOREIGN PATENT DOCUMENTS

| DE | 78 00 786 | 4/1978 |
|---|---|---|
| EP | 0 582 332 | 2/1994 |
| EP | 1 177 974 | 2/2002 |
| GB | 129707 | 7/1919 |
| GB | 2 012 217 | 7/1979 |

* cited by examiner

Primary Examiner—Euncha P. Cherry
(74) Attorney, Agent, or Firm—Ohlandt, Greeley, Ruggiero & Perle, L.L.P.

(57) ABSTRACT

An optical device for use under significantly varying ambient pressure is provided comprising a housing, a transparent element, a first sealing device and a protection apparatus. The housing has an interior part, an environment outside the housing and a recess in a first region. The transparent element is arranged in the first region in a region of the recess. The first sealing device is sealing a first sealing gap between the transparent element and the housing. Furthermore, the first sealing device is sealing the interior part of the housing relative to the environment of the housing up to a first pressure level. The protection apparatus is arranged outside the housing and is displaceable from a first functional position into a second functional position. Furthermore, the protection apparatus, in the first functional position, covers the transparent element and seals the first region relative to the environment of the housing in such a way that a pressure in an intermediate space between the protection apparatus and the first region is not higher than the first pressure level if an ambient pressure in the environment of the housing exceeds the first pressure level. Finally, the protection apparatus, in the second functional position, leaves the transparent element uncovered.

20 Claims, 3 Drawing Sheets

OPTICAL DEVICE FOR USE UNDER SIGNIFICANTLY VARYING AMBIENT PRESSURE

BACKGROUND OF THE INVENTION

The present invention pertains to an optical device for use under significantly varying ambient pressure. The invention may be used in the context of a periscope or an optronics mast.

In conventional periscopes or optronics masts for submarines, the panes, through which the light is incident, and the corresponding seal of the housing need to withstand the ambient pressure in any situation. Due to the high ambient pressures occurring in the submerged state, the expenditure for the seal is comparatively high and the panes themselves need to be realized in a comparatively thick and consequently costly fashion in order to withstand these high pressures. This not only results in a comparatively expensive, heavy and large arrangement, but the required thickness of the panes also has negative effects on the optical performance of the entire system due to the associated absorption and the aberrations resulting thereof.

On the other hand, to deal with the above problem of high pressures occurring in the submersed state, it is known from DE 78 00 786 U1 to completely retract the periscope or optronics mast into a receptacle integrated into the submarine's shell. The receptacle is then sealed using a cover at the free end of the periscope or optronics mast. Anyway, this has the disadvantage that the periscope or optronics mast either must always be completely retracted at comparatively low submersion levels with low pressure levels or the components will have to be designed for higher pressure levels.

SUMMARY OF THE INVENTION

It is thus an object of the present invention to, at least to some extent, overcome the above disadvantages and to provide good and long term reliable imaging properties of an optical system used in an exposure process.

It is a further object of the present invention to provide an optical device having an improved optical performance of the entire system while simultaneously reducing the expenditure.

The present invention is based on the notion that an improved optical performance of the entire system can be achieved with a reduced expenditure by providing a protection apparatus that can be moved from a first functional position into a second functional position and is arranged outside the housing. In its first functional position, the protection apparatus covers and seals the first region relative to the environment of the housing in such a way that the pressure in an intermediate space between the protection apparatus and the first region is not higher than the first pressure level.

Thus, according to a first aspect of the present invention there is provided an optical device for use under significantly varying ambient pressure comprising a housing, a transparent element, a first sealing device and a protection apparatus. The housing has an interior part, an environment outside the housing and a recess in a first region. The transparent element is arranged in the first region in a region of the recess. The first sealing device is sealing a first sealing gap between the transparent element and the housing. Furthermore, the first sealing device is sealing the interior part of the housing relative to the environment of the housing up to a first pressure level. The protection apparatus is arranged outside the housing and is displaceable from a first functional position into a second functional position. Furthermore, the protection apparatus, in the first functional position, covers the transparent element and seals the first region relative to the environment of the housing in such a way that a pressure in an intermediate space between the protection apparatus and the first region is not higher than the first pressure level if an ambient pressure in the environment of the housing exceeds the first pressure level. Finally, the protection apparatus, in the second functional position, leaves the transparent element uncovered.

According to a second aspect of the present invention there is provided an optical device for use under significantly varying ambient pressure comprising a housing, a transparent element, a first sealing device and a protection apparatus. The housing has an interior part, an environment outside the housing and a recess in a first region. The transparent element is arranged in the first region in a region of the recess. The first sealing device is sealing a first sealing gap between the transparent element and the housing. Furthermore, the first sealing device sealing the interior part of the housing relative to the environment of the housing up to a first pressure level. The protection apparatus is arranged outside the housing and is displaceable from a first functional position into a second functional position. Furthermore, the protection apparatus, in the first functional position, covers the transparent element and seals the first region relative to the environment of the housing up to a second pressure level above the first pressure level. Finally, the protection apparatus, in the second functional position, leaves the transparent element uncovered.

Due to these measures, the transparent element as well as the first sealing device only need to be designed for a comparatively low first pressure level, since they are protected from higher ambient pressures by the protection apparatus. This makes it possible to realize the transparent element, for example, a planar or convex pane or a lens, in a correspondingly thin fashion such that not only the material and the manufacturing costs for the transparent element are lowered, but the optical performance of the entire system is also improved because the absorption losses and aberrations are reduced due to the reduced thickness of the transparent element.

The optical device according to the invention may be advantageously utilized in all applications, in which the light only needs to be incident into the interior of the housing through the transparent element at comparatively low ambient pressures. This is the case, for example, with periscopes or optronics masts on submarines. Their optical functions, for example, a visual reconnaissance, usually are only required when their corresponding end is situated above the water level. The optical function is not required in the submerged state while the periscope or the optronics mast is retracted. This means that the transparent element can be covered by the protection apparatus without any negative effects in this state.

However, it will be appreciated that the present invention may also be utilized in any other application, in which a corresponding pressure-dependent functional separation into a primary optical function at low ambient pressures and a primary sealing function at high ambient pressures may be made.

Further aspects and embodiments of the present invention will become apparent from the dependent claims and the following description of preferred embodiments which refers to the appended figures. All combinations of the

DETAILED DESCRIPTION OF THE INVENTION

Figure 1:
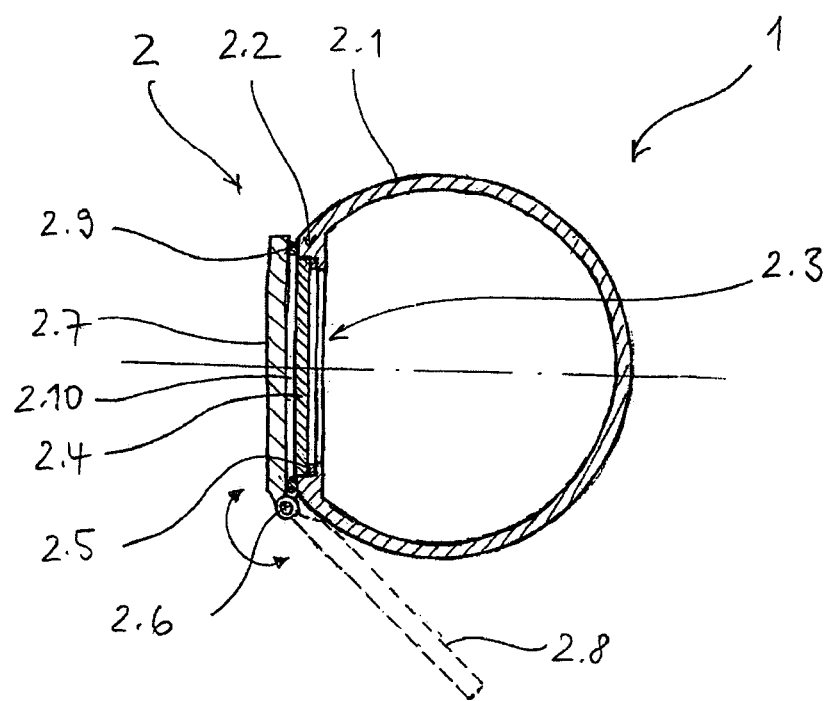
FIG. 1 is a schematic section through a periscope with a preferred embodiment of the optical device according to the invention.

In the following, after a few general remarks, several preferred embodiments of the optical device according to the invention will be described.

The first pressure level, in principle, may be chosen arbitrarily. The optical device according to the invention preferably is designed for the operation up to a permissible maximum pressure level. The first pressure level preferably lies below 30% of this permissible maximum pressure level. The first pressure level more preferably lies below 20% of the permissible maximum pressure level, particularly below 10% of the permissible maximum pressure level. It is preferred that the first pressure level lies below 3 bar, particularly below 2 bar. This makes it possible to achieve a particular simple configuration of the transparent element and the first sealing device.

The above specifications are based on a normal pressure of approximately 1 bar in the interior of the housing. It will be appreciated that the differential pressure between the housing interior and the surroundings of the housing is decisive for the design of the transparent element and the first sealing device. If the pressure in the housing interior is higher than indicated above, the first pressure level may also be correspondingly higher.

In its first functional position, the protection apparatus preferably adjoins and seals the housing in such a way that the pressure in the intermediate space between the protection apparatus and the first region of the housing containing the transparent element does not exceed the first pressure level at any ambient pressure. The sealing is preferably realized such that an approximately constant pressure level is ensured in this intermediate space independently of the ambient pressure so as to minimize the mechanical loads, particularly the alternating loads, on the transparent element and the first sealing device.

The protection apparatus, in principle, may be of an arbitrary design as long as it fulfils its protective function in its first functional position. It is possible, in particular, to choose essentially arbitrary motion sequences for the displacement between the first functional position and the second functional position.

In simple and consequently preferred embodiments of the optical device according to the invention, the protection apparatus is pivotably mounted to the housing. It may be realized, for example, in the form of a simple cover that is pivotably mounted to the housing such that it covers the transparent element in its first functional position.

In other preferred embodiments of the optical device according to the invention, the protection apparatus is mounted displaceably to the housing. In this case, the protection apparatus may simply consist, for example, of a locking bulkhead or the like that is pushed in front of the transparent element in a corresponding frame in order to protect the transparent element from the ambient pressure in the first functional position. In this respect, it will be appreciated that the protection apparatus may be designed such that it may be displaced in a rotatory and/or translatory manner.

In particularly simple embodiments of the optical device according to the invention, the housing is realized in a tubular fashion and the protection apparatus is a tubular casing that surrounds the housing. This casing may be simply displaced into its first functional position in the axial direction.

The seal between the protection apparatus situated in the first functional position and the housing may essentially be realized in any suitable fashion. It is preferred to provide at least one second sealing device that seals a second sealing gap between the housing and the protection apparatus situated in its first functional position. The second sealing device may be arranged, for example, on the protection apparatus. Anyway, preferably, the second sealing device is arranged on the housing in order to maintain the moving masses at a minimum.

Any suitably designed drive may be provided for displacing the protection apparatus between its first functional position and its section functional position. Such drives may be, for example, mechanical, electrical or hydraulic drives or combinations thereof. In preferred embodiments of the optical device according to the invention, the protection apparatus comprises a drive displacing the protection apparatus between the first and the second functional position, this drive being designed for automatically displacing the protection apparatus into the first functional position when the ambient pressure of the housing exceeds a predetermined first threshold value. The ambient pressure may be detected by means of a corresponding sensor or the like and transmitted to a control unit that is connected to the sensor and controls the drive accordingly.

It will be appreciated that the drive for displacing the optical device itself may also be utilized as the drive. This is usually the case with extensible periscopes and optronics masts, respectively. For example, corresponding mechanical stops, gears, etc., may be utilized in this case in order to ensure that the protection apparatus is displaced between the first and the second functional position at a certain extension position.

In order to ensure that the optical function of the optical device according to the invention is quickly available at correspondingly low pressures, it is proposed, in other advantageous embodiments of the optical device according to the invention, that the protection apparatus comprises a drive for displacing the protection apparatus between the first and the second functional position which is designed for automatically displacing the protection apparatus into the second functional position when the ambient pressure of the housing falls below a predetermined second threshold value. In this case, the ambient pressure may also be detected by means of a corresponding sensor or the like and transmitted to a control unit that is connected to the sensor and controls the drive accordingly.

Depending on the respective field of application of the optical device, the transparent element may be respectively designed or optimized for arbitrary wavelengths. In advantageous variations of the optical device that are particularly suitable for use in submarines, the transparent element is designed at least for use in the visible light range. Additionally or alternatively, the transparent element may be designed at least for use in the infrared range, particularly in the wavelength range between 1 µm and 15 µm. In this case, the transparent element may be designed, in particular, for use in the wavelength range between 3 µm and 5 µm and/or the wavelength range between 8 µm and 12 µm.

First Embodiment

In the following, a first preferred embodiment of an optical device according to the invention will be described with reference to FIG. 1. FIG. 1 shows a schematic section through a periscope 1 of a submarine with a first preferred embodiment of the optical device 2 according to the invention arranged on the free end of the periscope 1.

The optical device 1 comprises a housing 2.1 with a first region 2.2 that contains a window-like recess 2.3. A transparent element in the form of a transparent pane 2.4 is inserted into this recess 2.3. Light can be incident into the interior of the housing 2.1 through the pane 2.4.

In the interior of the housing, the remainder of the optical system of the periscope 1—not illustrated in FIG. 1—is situated adjacent to the pane 2.4. This optical system needs to be protected from the admission of moisture.

A first sealing gap between the pane 2.4 and the housing 2.1 is sealed by means of a first sealing device in the form of a first gasket 2.5. In other words, the first gasket seals the interior of the housing 2.1 relative to the environment of the housing 2.1 that is under a certain ambient pressure.

The periscope 1 is designed for the operation up to a permissible maximum pressure level of 40 bar. The pane 2.4 and the first gasket are designed for a first ambient pressure level of 2 bar. The first pressure level consequently corresponds to 5% of the permissible maximum pressure level. The pane 2.4 as well as the first gasket 2.5 may be realized in a comparatively simple fashion because they only need to be designed for a comparatively low pressure level. The pane 2.4, in particular, has a relatively small thickness. This has advantageous effects on the entire optical performance of the system because the reduced thickness of the pane 2.4 only causes comparatively low absorption losses and aberrations to occur.

This design of the pane 2.4 and the first gasket 2.5 ensures that these components are able to withstand the ambient pressures above the water surface and at slight depths below the water surface in order to seal the interior of the housing 2.1.

A protection apparatus in the form of a cover 2.7 that may be pivoted about an axis 2.6 is provided in order to also reliably seal the interior of the housing 2.1 at greater depths below the water surface. The cover 2.7 is displaced between its first functional position shown and its second functional position that is indicated with the broken lines 2.8 by means of a—not-shown—drive. The cover 2.7 covers the pane 2.4 in its first functional position and leaves the pane 2.4 uncovered in its second functional position.

In its first functional position, the cover 2.7 covers and seals the first region 2.2 of the housing 2.1 containing the pane 2.4 relative to the environment. The cover adjoins a second sealing device in the form of a second gasket 2.9 that is arranged on the outer side of the housing 2.1. The cover 2.7, its drive as well as its locking mechanism and the gasket 2.9 are designed in such a way that the pressure in the intermediate space 2.10 between the cover 2.7 and the first region 2.2 of the housing 2.1 is not higher than the above-mentioned first pressure level independently of the ambient pressure in the surroundings of the housing 2.1. In other words, the pressure in this intermediate space 2.10 is no higher than approximately 2 bar. It will be appreciated that these components may be designed, in particular, in such a way that essentially no pressure change occurs in the intermediate space 2.10 independently of the ambient pressure in the environment of the housing 2.1.

The cover 2.7 and the corresponding drive are designed in such a way that the cover 2.7 is automatically displaced into its first functional position if the driving mechanism fails so as to prevent the optical system from becoming damaged in the submerged state. The cover may at least sectionally consist of a correspondingly transparent material in order to realize an optical emergency function in such instances.

Second Embodiment

Figure 2:
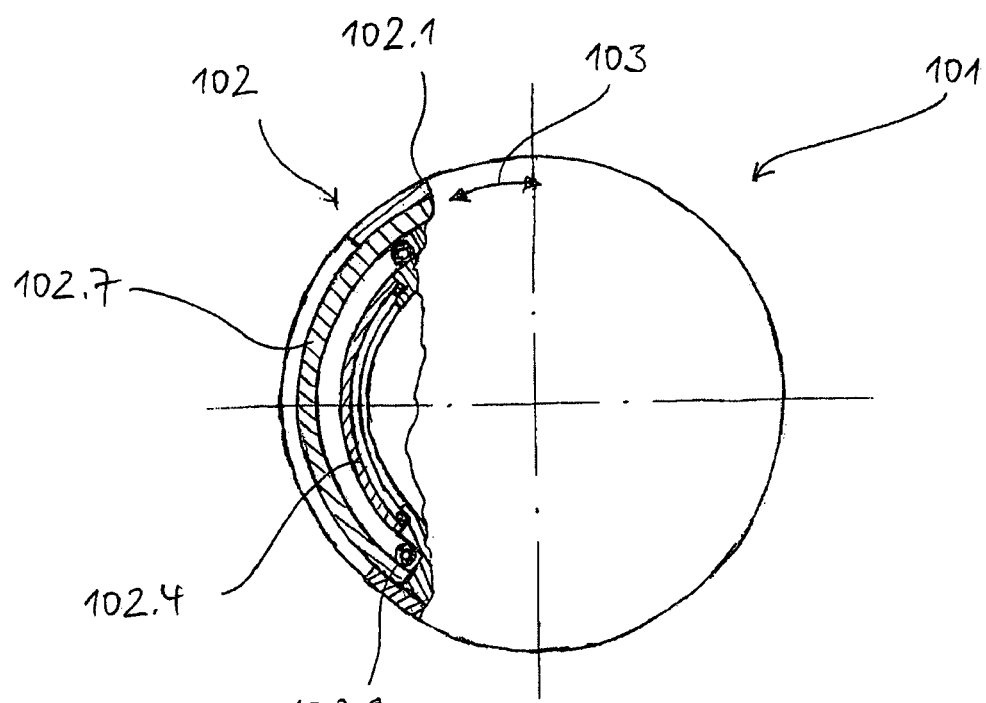
FIG. 2 is a schematic section through another periscope with another preferred embodiment of an optical device according to the invention.

In the following, a second preferred embodiment of an optical device according to the invention will be described with reference to FIG. 2. FIG. 2 shows a schematic section through another preferred embodiment of a periscope 101 for a submarine, wherein another preferred embodiment of the optical device 102 according to the invention is arranged on the free end of the periscope 101. Since the basic function and design of this embodiment correspond to those of the embodiment shown in FIG. 1, only the respective differences between the two embodiments are discussed.

A first difference can be seen in the fact that the protection apparatus is realized in the form of a displaceable bulkhead 102.7 that is supported in the housing 102.1 and may be displaced in the direction of the double arrow 103, namely between the first functional position shown in which it covers the pane 102.4 and the second functional position—not shown—in which it leaves the pane 102.4 uncovered.

Another difference is that the second gasket 102.9 consists of a tubular gasket that may be acted upon with pressure from inside in order to ensure the sealing effect.

Third Embodiment

Figure 3:
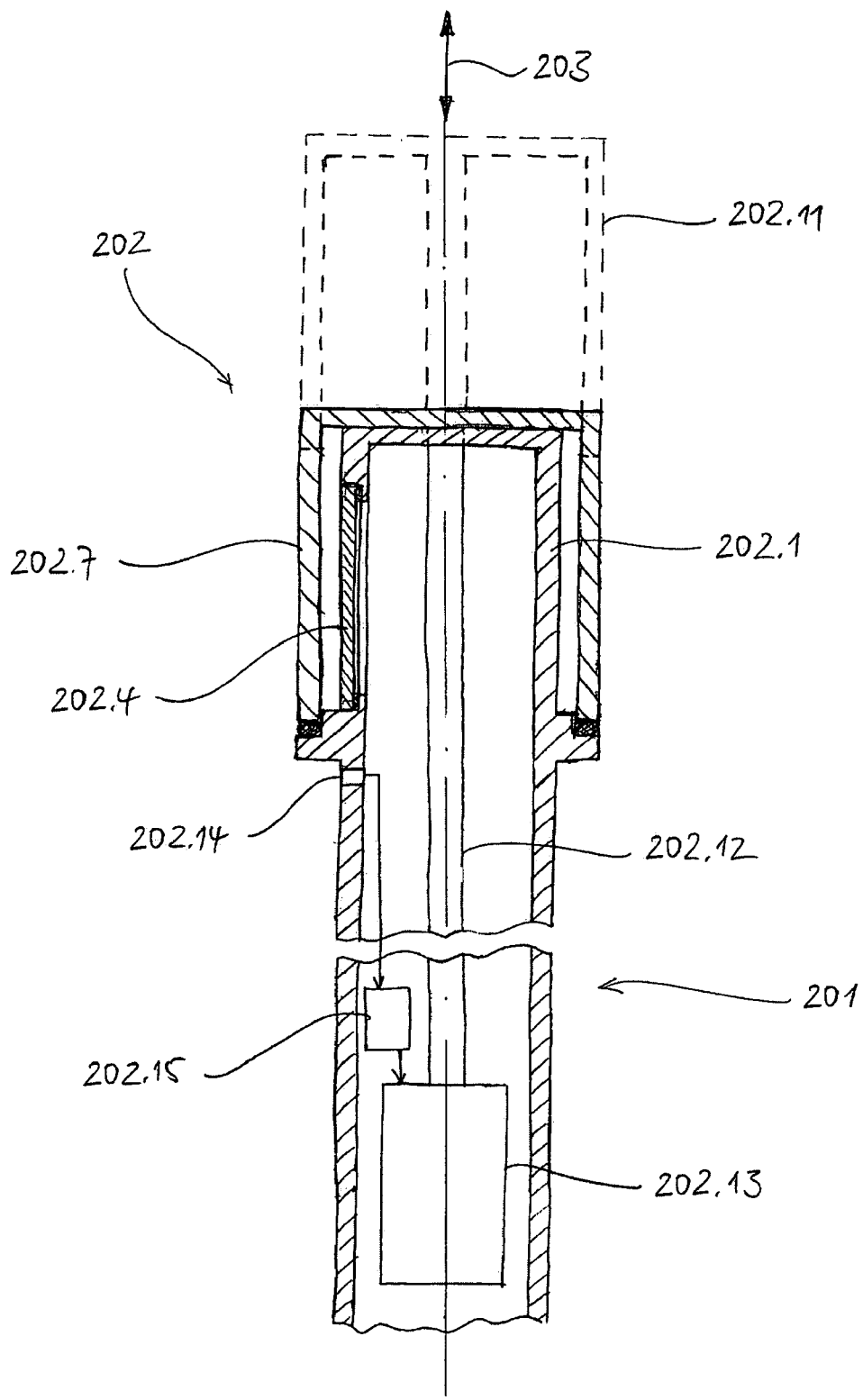
FIG. 3 is a schematic section through an optronics mast with another preferred embodiment of an optical device according to the invention.

In the following, a third preferred embodiment of an optical device according to the invention will be described with reference to FIG. 3. FIG. 3 shows a schematic section through an optronics mast 201 for a submarine, wherein another preferred embodiment of the optical device 202 according to the invention is arranged on the free end of the optronics mast 201. Since the basic function and design of this embodiment also correspond to those of the embodiment shown in FIG. 1, only the respective differences between the two embodiments are discussed.

A first difference can be seen in the fact that the protection apparatus comprises a tubular casing in the form of a tubular cap 202.7 that surrounds the tubular housing 202.1 in the first functional position. The cap may be displaced in the direction of the double arrow 203, namely between the first functional position shown in which it covers the pane 202.4 and the second functional position that is indicated with broken lines 202.11 and in which it leaves the pane 202.4 uncovered.

The cap 202.7 is displaced by a motor 202.13 with the aid of connecting push and pull rods 202.12 that extend at the inner circumference of the housing 202.1. The housing 202.1 contains a pressure sensor 202.14 that detects the ambient pressure and transmits a corresponding signal to the control unit 202.15 of the motor 202.13 that is connected to the sensor. The control unit 202.15 is designed in such a way that it causes the motor 202.13 to displace the cap 202.7 into its first functional position as soon as the ambient pressure exceeds a first threshold value. The control unit 202.15 is also designed in such a way that it causes the motor 202.13 to displace the cap 202.7 into its second functional position as soon as the ambient pressure falls below a second threshold value.

In this case, the first threshold value depends on how quickly the pressure is expected to increase. Depending on the expected speed of the pressure increase and the time required for displacing the cap into the first functional position, the first threshold value lies more or less below the first pressure level in order to ensure that the cap is situated in its first functional position in a timely fashion before the ambient pressure exceeds the first pressure level.

The first limiting value, in particular, may be variable. It may be dependent on current state parameters of the submarine, for example, the current rate of descent, etc. It may also be varied based on a pressure development prognosis that is set up using the values delivered by the pressure sensor 202.14.

The second threshold value may consist of a fixed value. However, the second threshold value may also be defined similar to the first threshold value. For example, it may depend on the speed of the expected pressure drop. Depending on the expected speed of the pressure drop and the time required for displacing the cap into the second functional position, it lies more or less below the first pressure level in order to ensure that the cap is situated in its second functional position in a timely fashion when or before the water surface is reached.

The second threshold value may also be variable. For example, it may depend on current state parameters of the submarine, for example, the current rate of ascent, etc. It may also be varied based on a pressure development prognosis that is set up using the values delivered by the pressure sensor 202.14.

Fourth Embodiment

Figure 4:
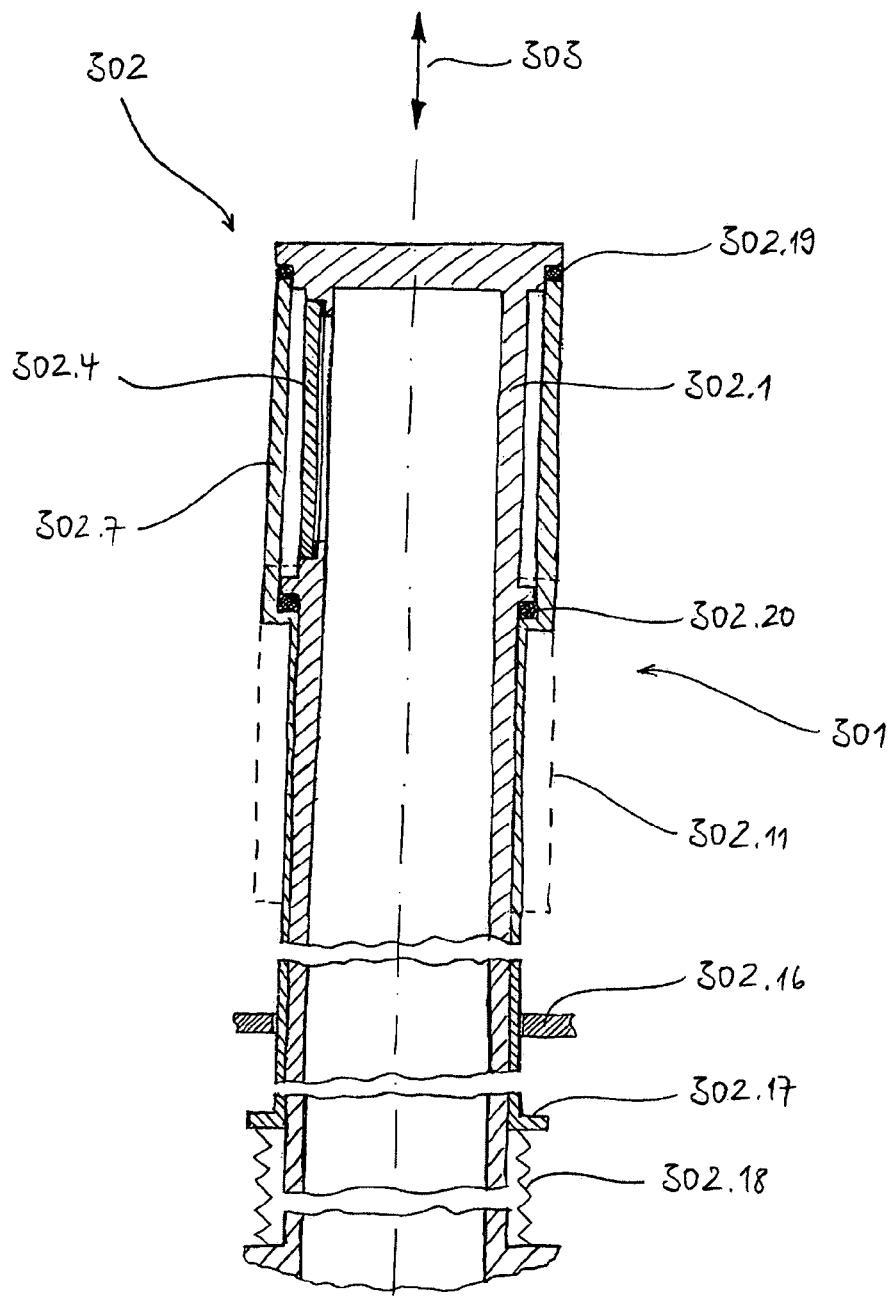
FIG. 4 is a schematic section through another optronics mast with another preferred embodiment of an optical device according to the invention.

In the following, a fourth preferred embodiment of an optical device according to the invention will be described with reference to FIG. 4. FIG. 4 shows a schematic section through another preferred embodiment of an optronics mast 301 for a submarine, wherein another preferred embodiment of the optical device 302 according to the invention is arranged on the free end of the optronics mast 301. Since the basic function and design of this embodiment correspond to those of the embodiment shown in FIG. 3, only the respective differences between the two embodiments are discussed.

One difference can be seen in the fact that the protection apparatus is realized in the form of a tubular casing 302.7 that surrounds the tubular housing 302.1 in the first and in the second functional position. The casing 302.7 may be displaced in the direction of the double arrow 303, namely between the first functional position shown in which it covers the pane 302.4 and the second functional position that is indicated with broken lines 302.11 and in which it leaves the pane 302.4 uncovered.

Another difference is that the drive for displacing the optronics mast 301 relative to the submarine between a retracted idle position and an extended operative position serves as the drive for the tubular casing 302.7. In this case, the casing 302.7 is displaced from the first functional position shown into the second functional position indicated with broken lines 302.11 when a predetermined first extension position of the optronics mast 301 is reached during the extension of the optronics mast 301.

This is achieved with first mechanical stops 302.16 that are arranged stationarily relative to the tubular housing 302.1 and the optronics mast 301. The first stops 302.16 engage with second stops 302.17 of the casing 302.7 in the first extension position of the optronics mast 301. This causes the casing 302.7 to be held back while the tubular housing 302.1 is further extended. During the retraction of the optronics mast 301, resetting elements 302.18 of variable length—only schematically indicated in FIG. 4—ensure that the casing 302.7 is displaced back into its first functional position. The resetting elements 302.18 also contribute decisively to the contact pressure between the casing 302.7 and the gaskets 302.19 and 302.20.

In other words, the protection apparatus is actuated automatically as the optronics mast 301 is respectively extended and retracted. This may also be realized with a correspondingly actuated switch or the like. In this context, it would also be conceivable to provide a safety circuit that is dependent on the pressure or the depth of submersion and ensures that the casing 302.7 is displaced between the first and the second functional position in a timely fashion by preventing the optronics mast 301 from being fully extended unless the expected pressure in the region of the pane 302.4 lies below the first pressure level.

This configuration with a casing 302.7 that surrounds the housing 302.1 in the first and in the second functional position makes it possible to achieve a particularly robust design that has small space requirements.

In all above-described embodiments of the optical device according to the invention, the pane or the transparent element, respectively, is designed for use in the visible light range and the infrared range, particularly in the wavelength range between 1 µm and 10 µm. It will be appreciated that the transparent element may also be optimized for other wavelength ranges in other variations of the invention.

What is claimed is:

1. An optical device for use under significantly varying ambient pressure comprising:
   a housing,
   a transparent element,
   a first sealing device and
   a protection apparatus;
   said housing having an interior part, an environment outside said housing and a recess in a first region;
   said transparent element being arranged in said first region in a region of said recess;
   said first sealing device sealing a first sealing gap between said transparent element and said housing;
   said first sealing device sealing said interior part of said housing relative to said environment of said housing up to a first pressure level;
   said protection apparatus being arranged outside said housing and being displaceable from a first functional position into a second functional position;
   said protection apparatus, in said first functional position, covering said transparent element and sealing said first region relative to said environment of said housing in such a way that a pressure in an intermediate space between said protection apparatus and said first region is not higher than said first pressure level if an ambient pressure in said environment of said housing exceeds said first pressure level;
   said protection apparatus, in said second functional position, leaving said transparent element uncovered.

2. The optical device according to claim 1,
wherein said optical device has a permissible maximum pressure level, and
wherein said first pressure level lies below 30% of said permissible maximum pressure level.

3. The optical device according to claim 2, wherein said first pressure level lies below 10% of said permissible maximum pressure level.

4. The optical device according to claim 1, wherein said first pressure level lies below 3 bar.

5. The optical device according to claim 1, wherein said protection apparatus is pivotably mounted to said housing.

6. The optical device according to claim 1, wherein said protection apparatus is displaceably mounted to said housing.

7. The optical device according to claim 6, wherein said housing has a tubular shape and said protection apparatus is a tubular casing surrounding said housing.

8. The optical device according to claim 1, wherein
at least a second sealing device is provided
said second sealing device sealing a second sealing gap between said housing and said protection apparatus situated in said first functional position.

9. The optical device according to claim 8, said second sealing device being arranged on said housing.

10. The optical device according to claim 1, wherein
said protection apparatus comprises a drive displacing said protection apparatus between said first functional position and said second functional position,
said drive automatically displacing said protection apparatus into said first functional position when said ambient pressure exceeds a predetermined first threshold value.

11. The optical device according to claim 1, wherein
said protection apparatus comprises a drive displacing said protection apparatus between said first functional position and said second functional position,
said drive automatically displacing said protection apparatus into said second functional position when said ambient pressure falls below a predetermined second threshold value.

12. The optical device according to claim 1, wherein said transparent element is transparent to light in a visible light range.

13. The optical device according to claim 1, wherein said transparent element is transparent to light in an infrared light range.

14. The optical device according to claim 13, wherein said transparent element is transparent to light having a wavelength range between 1 μm and 15 μm.

15. The optical device according to claim 1, wherein it is a periscope or an optronics mast of a submarine.

16. An optical device for use under significantly varying ambient pressure comprising:
a housing,
a transparent element,
a first sealing device and
a protection apparatus;
said housing having an interior part, an environment outside said housing and a recess in a first region;
said transparent element being arranged in said first region in a region of said recess;
said first sealing device sealing a first sealing gap between said transparent element and said housing;
said first sealing device sealing said interior part of said housing relative to said environment of said housing up to a first pressure level;
said protection apparatus being arranged outside said housing and being displaceable from a first functional position into a second functional position;
said protection apparatus, in said first functional position, covering said transparent element and sealing said first region relative to said environment of said housing up to a second pressure level above said first pressure level;
said protection apparatus, in said second functional position, leaving said transparent element uncovered.

17. The optical device according to claim 16,
wherein said optical device has a permissible maximum pressure level, and
wherein said second pressure level substantially corresponds to said permissible maximum pressure level.

18. The optical device according to claim 17, wherein said first pressure level lies below 30% of said permissible maximum pressure level.

19. The optical device according to claim 16, wherein said protection apparatus is moveably mounted to said housing.

20. The optical device according to claim 19, wherein said housing has a tubular shape and said protection apparatus is a tubular casing surrounding said housing.

* * * * *